Oct. 7, 1941.    W. P. HARRINGTON    2,258,384
TIRE DEFLATION INDICATOR
Filed March 28, 1940    3 Sheets-Sheet 2
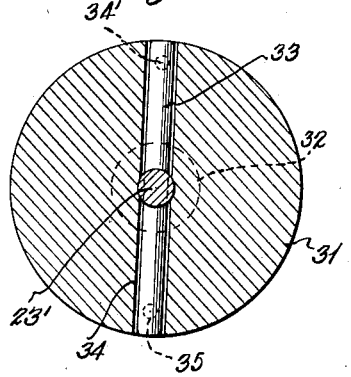
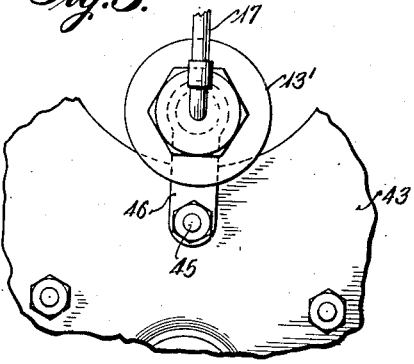
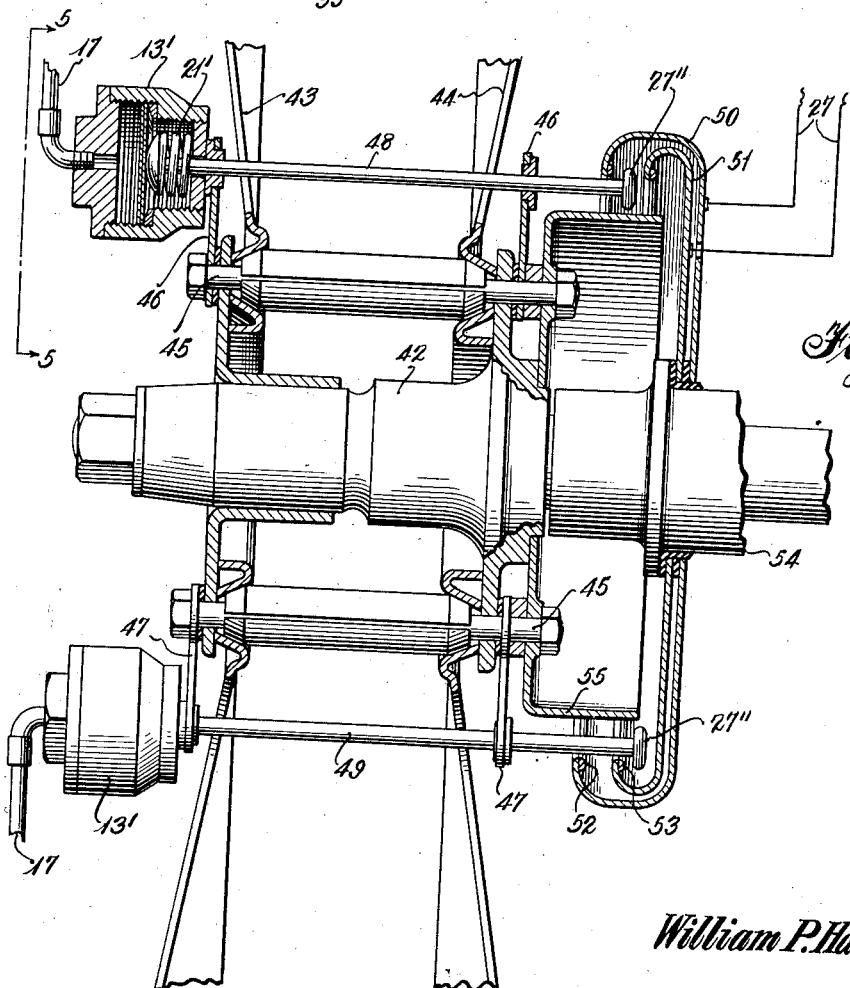
Inventor
William P. Harrington
By Brown & Phelps
Attorneys

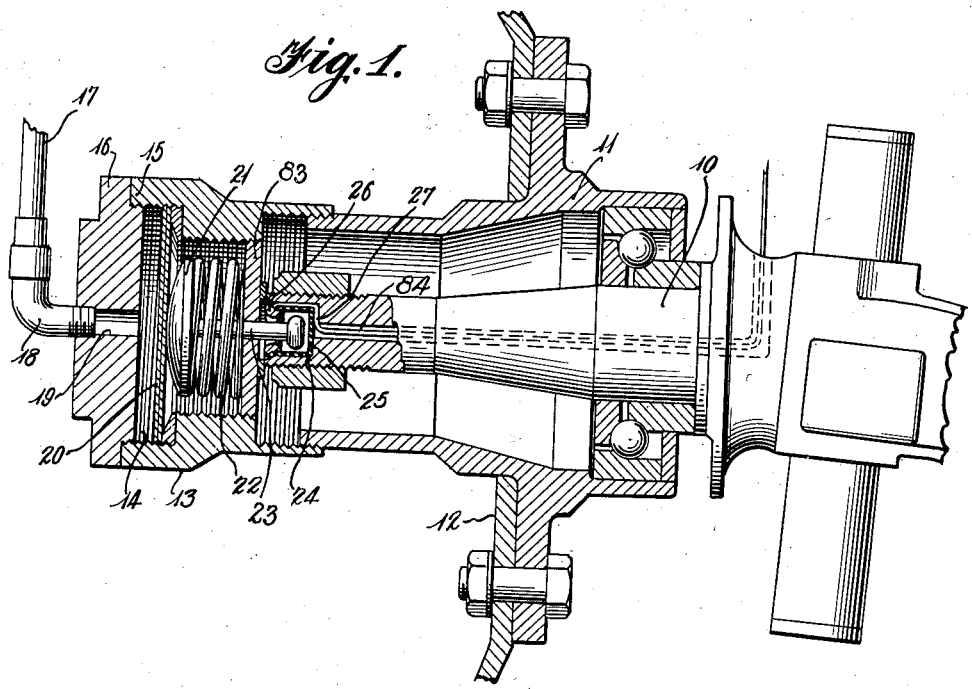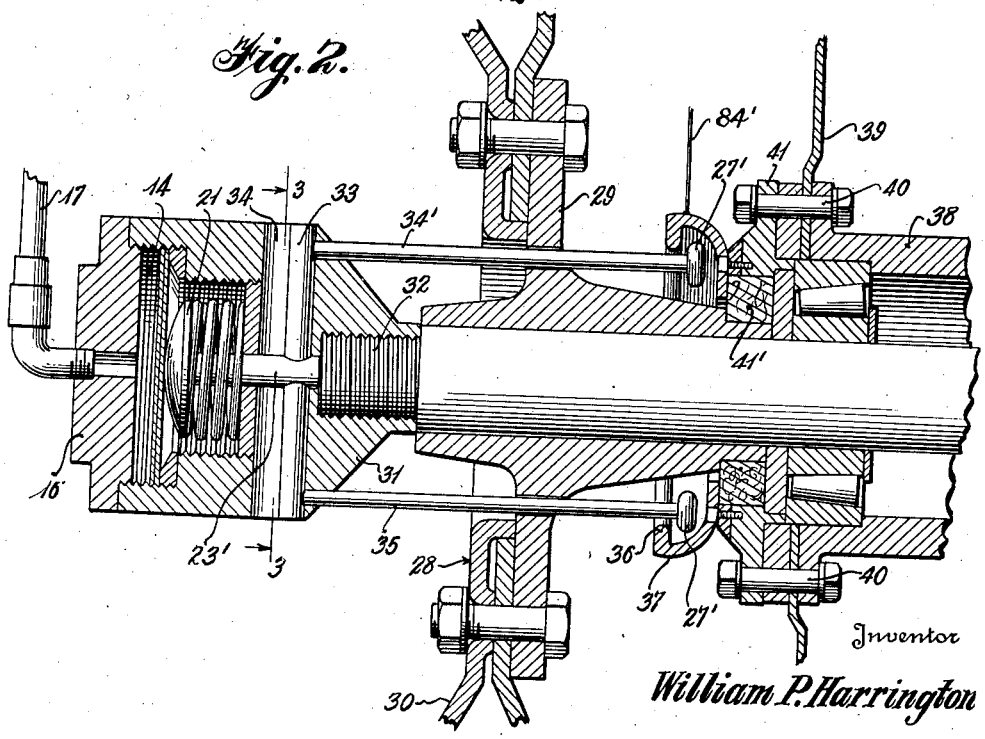

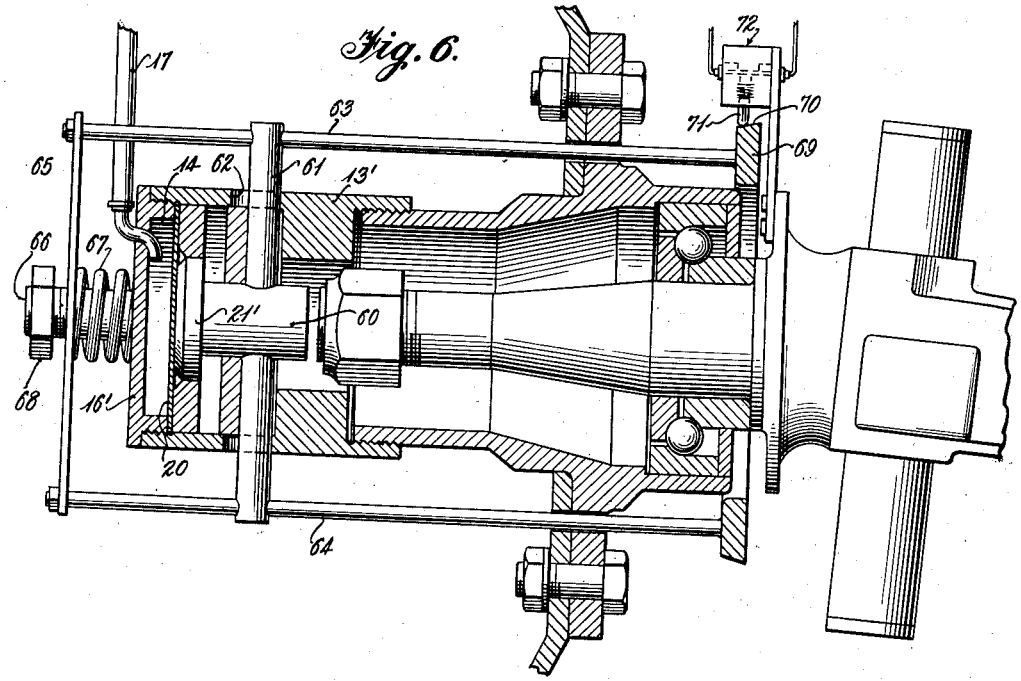
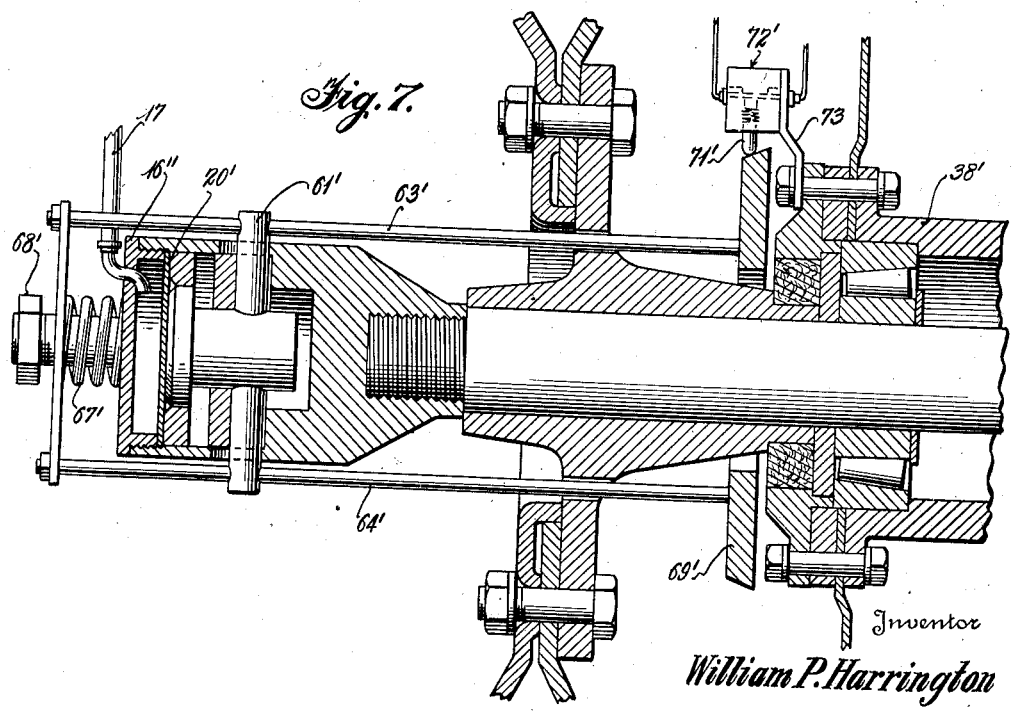

Patented Oct. 7, 1941

2,258,384

UNITED STATES PATENT OFFICE 2,258,384

TIRE DEFLATION INDICATOR

William Patrick Harrington, Hattiesburg, Miss.

Application March 28, 1940, Serial No. 326,515

2 Claims. (Cl. 200—58)

The invention relates to devices for indicating the deflation of tires and has as an object the provision of a device that will give an indication by way of an alarm or other character of indication when the inflation of a tire becomes dangerously low.

It is a further object of the invention to provide a device that will indicate under-inflation and will give warning before the tire becomes fully deflated, thereby avoiding injury to the tire caused by running with the tire flat.

It is a further object of the invention to provide a device that may be applied to existing vehicles or which may be built into the vehicle during the course of its manufacture.

Further objects of the invention will appear from the following description when read in connection with the accompanying drawings showing illustrative embodiments of the invention, and wherein—

Figure 1 is a detail vertical section through the hub of a front wheel showing the device in section with one bearing omitted;

Fig. 2 is a like section showing the device applied to the rear wheel;

Fig. 3 is a vertical section on line 3—3 of Figure 2;

Fig. 4 is a detail vertical section on two of the devices applied to a dual tire rear wheel assembly;

Fig. 5 is a detail face view taken at the location indicated by line 5—5 of Figure 4.

Fig. 6 is a view corresponding to Figure 1 of another form of the invention applied to a front wheel; and Fig. 7 is a like view of the form of Figure 6 applied to a rear wheel.

As shown in Figure 1 the front wheel spindle 10 carries the hub 11 upon which a removable disc wheel is mounted, a detail of which is shown at 12. Upon the hub 11 there is shown a cylinder 13 mounted by screwthreads, which cylinder is formed with a chamber 14 provided by extension of the walls of the cylinder at 15, which chamber is shown as closed by means of a screw-threaded cap disc 16.

To connect the chamber 14 with the tire valve stem, a pipe 17 is indicated connected as by an elbow 18 with the cap 16 and in communication with an opening 19 into said chamber. The pipe 17 may be connected in any well known manner with the valve stem of the tire, desirably by connection which may be separated and which when connected depresses the valve plunger to place the chamber 14 into free communication with the interior of the inner tube of the tire. Such connections are well known and customarily have in a T-connection therewith a valve inlet for application of an air pressure hose for inflation of the tire.

The connection of the pipe 17 with the valve must be readily separable to provide for the removal of the wheel 12 carrying the tire in the usual manner. It is to be understood that the cylinder 13, tube 17, and connecting parts may be enclosed within the hub cap, not shown. Instead of detachable connection of pipe 17 with the tire valve stem, a connection of this character to the elbow 18 or to the cap 16 may be provided, in which case each of the tires including the spare tire would have a tube 17 individual to it.

In the chamber 14 there is shown a diaphragm 20 in contact at its central portion with plunger 21 pressed outwardly by means of a spring 22 abutting against a disk 83 having screwthreaded engagement with the interior of the spring chamber whereby the pressure of the spring 22 may be adjusted to determine the pressure at which the indicator will act.

Carried by the center of the plunger 21, there is shown a pin 23 extending into a chamber 24 in the end of the spindle 10 within which chamber there is shown a thimble 25 having a ring 26 providing an opening smaller than the interior of the thimble 25. The pin 23 is formed with a head 27 which when the spring 22 presses the diaphragm 20 outwardly upon underinflation of the tires will come into contact with the ring 26.

The cylinder 13, spring 22, and therefore the pin 23 are grounded upon the frame of the vehicle and at least the ring 26, if not also the cup 25, is insulated from the spindle 10 and connected parts.

A wire 84 is connected to the ring 26 and leads to a convenient place within the vision of the driver, as upon the dash of the vehicle, where it is connected to an indicating device as a lamp. Each tire of the vehicle will be equipped with a contact maker of the character described or that to be used with the rear wheel, each with its wire leading to a properly designated lamp upon the vehicle, from which lamps a common wire will lead to a switch and to the battery of the vehicle which is grounded. Desirably the switch referred to will be the ignition switch of the vehicle, in which case a tire going flat or becoming deflated while the vehicle is not in use will not provide a drain upon the battery but when the ignition is switched on to start the vehicle, the appropriate lamp will at once be lighted to warn the driver not to operate the vehicle until the defect has been removed.

In the form of the device shown in Figure 2 the rear wheel 28 of course revolves with the hub 29 and the tire carrying disc wheel 30 and therefore the form of the device shown in Figure 1 is not applicable.

In this form the fitting 31 may be screwed upon the threaded end 32 of the axle and is formed with a chamber 14 in communication by means of a pipe 17 with a tire as in the form already described.

Plunger 21 in this form carries a pin 23' connected to a cross head 33 having provision for motion by means of a slot 34 formed in the fitting 31.

Projecting from the cross head 33 there are shown a pair of rods 34', 35 slidable in openings in the hub 29 and having enlarged ends 27' standing behind the inturned edge 36 of the bell 37 stationary with the axle housing 38. As shown the disc 39 which carries the brake operating parts is secured to the axle housing by bolts 40, which bolts also secure ring 41 carrying the bell 37. A felt grease retainer is shown at 41'. Wire 84' is shown which leads to the indicator on the dash.

To provide for application of the device to a dual tire rear wheel as of a truck, the form of the invention shown in Figure 4 is provided wherein details of the separate disc wheels are shown at 43, 44. The wheels are mounted upon the hub 42 by means of bolts 45.

It is to be understood that the detail of the hub and mounting of the wheels for the dual tires may be anything desired, the form illustrated having been adopted from Patent No. 1,728,278, July 16, 1929, Nelson, merely for purpose of illustration.

For each of the separate tires there is shown a cylinder 13', each mounted by means of a bracket 46, 47 clamped in place by one of the bolts 45. The structure of the cylinder 13' and its connections with the separate tires are as already described and each thereof has connected to its spring-pressed plunger 21' a rod 48, 49 shown as projecting through the wheel discs to the interior of the bells 50, 51, which bells are each provided with inturned lips carrying the rings 52, 53.

The heads 27" upon the rods 48, 49 stand behind the rings 52, 53 in the same manner as already described. The bells 50, 51 are stationary upon the axle housing 54 and may be connected to or form a part of the stationary brake actuating mechanism to actuate a brake upon the interior of the brake drum 55.

The wires 27 lead from the respective bells 50, 51 which are insulated from each other and from the frame of the vehicle as shown. Therefore each of the fittings 13' will serve to give an indication if either of the dual tires be underinflated.

In Figure 6 is shown a form of the invention wherein the compression chamber 14 and the diaphragm 20 are shown, the diaphragm pressing upon a head 21', said head carried by a pin 60 carrying a cross head 61 movable in a slot 62 in the cylinder 13'.

Rigidly secured to opposite ends of the cross head 61 there are rods 63, 64 extending in opposite directions therefrom. Attached to one end of each of rods 63, 64 there is shown a bar 65 having a perforation through which passes a stud bolt 66 secured to the cap 16'. A compression spring 67 urges the head 65 to the left in Figure 6, the motion being limited by means of a nut 68. To the remaining ends of the rod 63, 64 there is rigidly secured an annular ring 69 having a bevelled edge 70 bearing against a plunger 71, which plunger when the ring 69 moves to the left in Figure 6 will close a switch 72.

It will be seen that when the pressure in the chamber 14 decreases, as upon the under-inflation or deflation of a tire to which the tube 17 is connected, the spring 67 will force the parts connected to the head 65 to the left, thus actuating the switch 72 to give a signal or alarm as already described.

In the form of Figure 7 for application to a rear wheel the parts are the same and the reference characters have been applied thereto each with an added prime. In this form the switch 72' is carried by bracket 73 rigidly mounted with the axle housing 38'. In this form of the device, the pressure at which the form of the device will be critical is determined by the seating of the nut 68 or 68'.

The operation of the device will be clear from the above description.

Minor changes may be made in the physical embodiments of the invention within the scope of the appended claims without departing from the spirit thereof.

I claim:

1. A tire deflation indicator comprising, in combination: a casing to have screw threaded connections with a revoluble axle; a pressure chamber in said casing to be placed into free communication with the interior of a tire mounted to revolve with said axle; said chamber having a movable wall; a plunger in said casing having a head spring-pressed against said movable wall; a plunger rod projecting from said head; a cross bar carried by said rod mounted for sliding movement in a slot formed in said casing; a pair of plunger rods projecting from said cross head parallel with the axis of the axle; an annular shell stationarily mounted upon the axle housing and having an overhanging annular lip; a contact means projecting from each of said rods into overlapping relation with said contact ring; whereby under-inflation of the tire may cause said contact means to be brought into contact with said ring.

2. A tire deflation indicator comprising, in combination: a casing mounted axially of a wheel to revolve with the wheel structure; a plunger housed axially in said casing; spring means urging said plunger outwardly of the wheel; means whereby said spring is resisted by air pressure in a tire mounted on said wheel structure; a cross bar carried by said plunger; a rod secured to said cross bar and projecting inwardly parallel with the axis of the wheel; a member carried by said rod; and a circuit completing member carried by a stationary portion of the vehicle chassis, lying in the path of outward movement of said rod-carried member whereby to complete a circuit upon deflation of the tire.

WILLIAM PATRICK HARRINGTON.